(12) United States Patent
Schindler (10) Patent No.: US 7,211,909 B2
(45) Date of Patent: May 1, 2007

(54) MONOLITHIC INTEGRATED CIRCUIT ARRANGEMENT

(75) Inventor: Gunther Schindler, Munich (DE)

(73) Assignee: Infineon Technologies AG, Munich (DE)

( * ) Notice: Subject to any disclaimer, the term of this patent is extended or adjusted under 35 U.S.C. 154(b) by 66 days.

(21) Appl. No.: 10/794,588

(22) Filed: Mar. 5, 2004

(65) Prior Publication Data

US 2004/0246647 A1 Dec. 9, 2004

(30) Foreign Application Priority Data

Mar. 7, 2003 (DE) .................. 103 10 161

(51) Int. Cl.
*H02K 7/00* (2006.01)
*H02K 33/00* (2006.01)
*H02K 35/00* (2006.01)
*H01H 47/00* (2006.01)
*H01F 13/00* (2006.01)

(52) U.S. Cl. ................ 310/17; 361/143; 361/148; 361/147

(58) Field of Classification Search .......... 361/147, 361/143, 148; 310/17
See application file for complete search history.

(56) References Cited

U.S. PATENT DOCUMENTS

| | | | |
|---|---|---|---|
| 4,857,893 A | 8/1989 | Carroll | |
| 6,475,639 B2 | 11/2002 | Shahinpoor et al. | |
| 6,632,697 B2 * | 10/2003 | Ueyanagi et al. | 438/48 |
| 6,691,802 B2 * | 2/2004 | Schultz et al. | 175/56 |

OTHER PUBLICATIONS

Wen J. Li, et al., "Infrared Signal Transmission by a Laser-Micromachined Vibration-Induced Power Generator", Proceedings 43rd IEEE Midwest Symposium on Circuits and Systems, Bd. 1, Aug. 8, 2000, pp. 236-239.
Scott Meninger, et al., "Vibration-to-Electric Energy Conversion", Proceedings 1999 International Symposium on Low Power Electronics and Design, Aug. 16, 1999, pp. 48-53.
B. Wagner, et al., "Microfabricated Actuator with Moving Permanent Magnet", Proceedings of the Workshop on Micro Electro Mechanical Systems. Investigation of Micro Structures, Sensors, Actuators, Machines and Robots, 1991, pp. 27-32.
Trifon M. Liakopoulos, et al., "Micromachined Thick Permanent Magnet Arrays on Silicon Wafers", IEEE Transactions on Magnetics, vol. 32, No. 5, Sep. 1996, pp. 5154-5156.
Li, WJ et al.; "A Micromachined Vibration-Induced Power Generator For Low Power Sensors of Robotic Systems"; Jamshidi, M et a. (eds.); Robotic and Manufacturing Systems, Recent Results in Research, Development and Applications, vol. 10, pp. 482-488, TSI Press Series, Alburquerque, USA.

(Continued)

*Primary Examiner*—Brian Sircus
*Assistant Examiner*—Dharti H. Patel
(74) *Attorney, Agent, or Firm*—Dickstein Shapiro LLP.

(57) ABSTRACT

A monolithic integrated circuit arrangement containing a substrate, a functional unit formed in and/or on the substrate, and an energy supply unit, which is formed in and/or on the substrate and is coupled to the functional unit and has an inductance and a permanent magnet. The inductance and the permanent magnet are arranged such that, under a vibration on the circuit arrangement, the permanent magnet is moved relative to the inductance such that an electrical induced voltage for supplying the functional unit with electrical energy is induced by the inductance.

21 Claims, 8 Drawing Sheets

OTHER PUBLICATIONS

Ching, NNH et al.; "A laser-micromachined multi-modal resonating power transducer for wireless sensing systems"; Sensors and Actuators A, vol. 97-98, Apr. 2002, pp. 685-690.

Ahn, CH et al.; "A Fully Integrated Micromagnetic Actuator With a Multilevel Meander Magnetic Core"; Technical Digest, IEEE Solid-State Sensor and Actuator Workshop, Hilton Head Island, South Carolina, Jun. 1992, pp. 14-18.

Williams, CB et al.; "Development of an Electromagnetic Micro-Generator"; Proceedings-Circuits, Devices and Systems, vol. 148, No. 6, Dec. 2001, pp. 337-342.

El-hami, M et al.; "Design and fabrication of a new vibration-based electromechanical power generator"; Sensors and Actuators A, vol. 92, No. 1-3, Aug. 2001, pp. 335-342.

* cited by examiner

FIG 7E

# MONOLITHIC INTEGRATED CIRCUIT ARRANGEMENT

CROSS-REFERENCE TO RELATED APPLICATION

This application is claims priority to German Application No. DE 103 10 161.6 filed Mar. 7, 2003.

FIELD OF THE INVENTION

The invention relates to a monolithic integrated circuit arrangement.

BACKGROUND OF THE INVENTION

The use of computer chips which can be operated contactlessly and in which wired leads are dispensable ("ubiquitous computing") is increasingly gaining in importance. An important area of application for this technical field is sensor technology, since a wire-free communication of a sensor signal to a central control unit is desirable for many applications of sensors.

The communication of such a contactless sensor computer chip with a central control or computing unit for the further processing of a contactlessly communicated sensor signal may be effected for example via a wire-free network (e.g., Bluetooth™).

Since a cost-effective, mechanically independent and universally deployable usability is desirable in the case of such wire-free computer chips, a wire-free energy supply is sought for such computer chips. The need for a wire-based power supply would lead to very high costs and additionally restrict the possibilities of use.

In the case of contactless identification labels (so-called "ID tags"), an electromagnetic field is coupled into the identification label often using a coil contained in the identification label. Using a rectifier, the electrical energy coupled in inductively can be rectified, so that it is possible to provide a DC current for supplying the identification label. However, this type of energy supply has the disadvantage that the identification label, for inductively coupling in electromagnetic field energy, always has to be positioned in a region with a very high electric field strength, which greatly limits the range of such a contactless chip.

Li, W. J. et al., "A micromachined Vibration-Induced Power Generator for Low Power Sensors of Robotic Systems", in: Jamshidi, M. et al. (eds.) "Robotic and Manufacturing Systems, Recent Results in Research, Development and Applications", Vol. 10, p. 482–488, TSI Press Series, Albuquerque, USA, discloses a macroscopic generator with a total volume of approximately one cubic centimeter, in which a permanent magnet, for example a rare earth permanent magnet having a weight of 21 milligrams, is arranged in the central region of a copper spring, and is exposed to vibration. An induced voltage can be induced in a coil on account of the temporally variable magnetic field generated by the vibrating permanent magnet, said induced voltage being used for example for supplying an electrical load that is provided externally.

However, the generator described in Li, W. J. et al., which is to be connected to an electrical load and serves for generating energy from the vibration of a macroscopic permanent magnet is complicated to produce and still has a volume that is too large for some applications.

U.S. Pat. No. 6,475,639 B2 describes sensors and actuators and also microelectromechanical systems (MEMS).

Ching, N. N. H. et al., "A laser-micromachined multimodal resonating power transducer for wireless sensing systems", in: Sensors and Actuators A, vol. 97–98, April 2002, p. 685–690, describes a generator for generating energy from vibration with a total volume of ~1 cm$^3$, which generator uses laser-produced springs in order to convert mechanical energy into electrical energy by means of Faraday's law.

U.S. Pat. No. 4,857,893 discloses a transponder unit which receives a carrier signal from an interrogation device.

Ahn, C. H. et al., "A Fully Integrated Micromagnetic Actuator with a Multilevel Meander Magnetic Core", in: Technical Digest, IEEE Solid-State Sensor and Actuator Workshop, Hilton Head Island S.C., June 1992, describes a fully integrated micromagnetic actuator with a multilevel meander magnetic core.

Williams, C. B. et al., "Development of an Electromagnetic Micro-Generator", in: Proceedings-Circuits, Devices and Systems, vol. 148, No. 6, December 2001, p. 337–342, describes a design methodology for linear microgenerators and is applied to the design of an mm scale electromagnetic microgenerator.

El-hami, M. et al., "Design and Fabrication of a New Vibration-Based Electromagnetic Power Generator", in: Sensors and Actuators A, vol. 92, No. 1–3, August 2001, p. 335–342, describes a device for generating electrical energy from mechanical energy in a vibrating environment.

SUMMARY OF THE INVENTION

The invention is based on the problem, in particular, of providing an arrangement with a functional unit that can be produced with a sufficiently low outlay, which functional unit can be autonomously supplied with electrical energy and is thus also suitable for contactless applications.

The problem is solved by means of a circuit arrangement having the features in accordance with the independent patent claim.

The circuit arrangement according to the invention is a monolithic integrated circuit arrangement having a substrate and a functional unit formed in and/or on the substrate. Furthermore, the monolithic integrated circuit arrangement has an energy supply unit, which is formed in and/or on the substrate and is coupled to the functional unit and has an inductance and a permanent magnet. Inductance and permanent magnet are set up in such a way that, under the action of a vibration on the circuit arrangement, the permanent magnet can be moved relative to the inductance in such a way that an electrical induced voltage for supplying the functional unit with electrical energy can be induced by means of the inductance.

A fundamental idea of the invention is to be seen in the fact that a circuit arrangement is provided which is integrated monolithically in a common substrate, such as a semiconductor substrate, for example, and has an energy supply unit that is likewise integrated monolithically in the substrate. The energy supply unit, which is coupled to the functional unit to be supplied, said functional unit being integrated monolithically in the substrate, converts the mechanical energy contained in external vibration (e.g., of a running motor) into electrical energy on-chip in accordance with the generator principle. Consequently, the functional unit, such as a sensor, for example, can be supplied with the electrical energy required for its operation autonomously, i.e., without additional external components.

The fact that all the components of the monolithic integrated circuit arrangement with functional unit and energy supply unit are monolithically integrated together in a substrate means that a genuinely on-chip energy supply is made possible. The transport paths for the electrical energy supply signals are also shortened as a result. Consequently, the electrical energy generated in the form of an electrical induced current experiences only very low ohmic losses on the path from the energy supply unit to the functional unit on account of the common integration in the substrate, with the result that a more efficient energy supply and therefore an improved efficiency are achieved.

The invention provides a circuit arrangement with an on-chip energy supply with reduced dimensioning, thereby achieving continued miniaturization. The circuit arrangement may be used for example in a miniaturized sensor chip, which then has a very small space requirement in the sensor environment assigned to it.

Furthermore, the on-chip integration of functional unit and energy supply unit enables the circuit arrangement according to the invention to be produced in a considerably simplified manner. Illustratively, fewer process steps are required for forming the circuit arrangement since the processing of the functional unit and the processing of the energy supply unit together with their integrated components (inductance and permanent magnet) are possible temporally in parallel from a process engineering standpoint. To put it another way, the IC processing for forming the functional unit and the production of the energy supply unit can be effected simultaneously.

Expressed illustratively, external vibration, for example the vibration of a motor to which a sensor is fitted as functional unit, is used for moving a permanent magnet relative to an inductance, as a result of which the magnetic field of the permanent magnet acts on the inductance in a temporally altered manner, so that the magnetic flux through the coil is exposed to a temporal alteration, as a result of which an induced voltage is generated between the ends of the inductance. The electrical energy contained in this voltage (or an associated current) is then used for supplying energy to the functional unit.

Functional unit in the sense of the invention is understood to be, in particular, that section of the circuit arrangement according to the invention which fulfills the actual functionality of the circuit arrangement externally and requires electrical energy in order to fulfill the functionality allocated to it. The functional unit serves to fulfill a task allocated to the circuit arrangement. Thus, the functional unit may be, by way of example, a sensor and/or an integrated circuit component (e.g., with a CPU and/or memory). One characteristic of the functional unit is, in particular, that the functional unit requires electrical energy in order to fulfill the functionality allocated to it, which electrical energy is provided by means of the energy supply unit. The bandwidth of possible functions which may be allocated to the functional unit is large. The functional unit may thus also be regarded as a useful device. It constitutes an energy-consuming region of the circuit arrangement according to the invention.

The invention thus provides a miniaturized on-chip solution for the energy supply of a monolithic integrated circuit arrangement that is preferably provided in wire-free fashion, in particular of the functional unit formed thereon.

By virtue of the fact that the invention utilizes mechanical vibrations in order illustratively to obtain electric current according to the generator principle, the circuit arrangement according to the invention may be used for example with a sensor as functional unit for monitoring a motor, the vibrations of the motor being used for supplying energy to the sensor.

The dimensions in which the circuit arrangement according to the invention is preferably formed are typical dimensions of semiconductor technology. The one-dimensional extents of the individual components may typically lie in a range between nanometers and about a hundred micrometers, preferably between about a hundred nanometers and a few tens of micrometers.

Preferred developments of the invention emerge from the dependent claims.

The substrate may be a semiconductor substrate, in particular a silicon or germanium substrate. The semiconductor substrate may be a wafer or a chip. The monolithic integrated circuit arrangement may be realized for example in CMOS technology.

The functional unit may be a sensor, in particular a rotational speed sensor, a temperature sensor, a pressure sensor, a chemical sensor, a gas sensor, a biosensor, a radiation sensor for detecting electromagnetic radiation, for example, and/or a sensor for detecting a vibration frequency. If the sensor is provided as a sensor for detecting a vibration frequency, then the mechanical vibration to be detected may serve as a detection signal and also as a source for generating electrical energy in the energy supply unit according to the invention. However, the functional unit may also be a micro-robot, micro-forceps, etc.

The circuit arrangement according to the invention may be set up for fitting to a vibration source. Illustratively, the circuit arrangement may be screwed or adhesively bonded for example to a motor or to a mobile telephone. The circuit arrangement may also be fitted to a beating heart.

The vibration source preferably has a motor. This motor may be an internal combustion engine (e.g., of a motor vehicle) or an electric motor.

The circuit arrangement of the invention may have a communication interface for contactless communication with an external control unit/control center. Using the Bluetooth™ standard, for example, a control signal can be communicated from a control center to the circuit arrangement. The circuit arrangement can also communicate a signal to the control center contactlessly, that is to say for example by emission of electromagnetic radiation (such as radiowaves, for example), for the purpose of signal exchange between circuit arrangement and external control unit. By way of example, the circuit arrangement can report a detected sensor signal to the external control unit contactlessly via the communication interface.

The advantages of an on-chip energy supply of the functional unit of the circuit arrangement are manifested to a particularly great extent in the case of a contactless application. Therefore, preferred areas of use of the invention are contactless smart cards, identification labels ("ID tags"), etc.

The energy supply unit may have a rectifier device for rectifying an induced voltage of the inductance, for supplying the functional unit with a DC voltage. Since many sensors or integrated circuit components are to be operated with an electrical DC voltage or an electrical DC current, it is advantageous for such applications to rectify the AC voltage generated on account of the vibration or the AC current related to said AC voltage prior to coupling into the functional unit. A rectifier device (e.g., a diode) known from the prior art may be used for this purpose.

The energy supply unit may have an energy storage unit, in which electrical charge carriers generated by means of the induced voltage can be buffer-stored. Illustratively, electrical energy generated on account of vibration may be stored in the energy storage unit in accordance with the battery principle and be output later as required. If, in a motor, for example, a parameter such as a temperature, for example, is intended to be detected even in a state in which said motor is free of vibration, then it is possible, during operation of the motor when the latter vibrates mechanically, for electrical energy to be generated in the energy supply unit of the circuit arrangement and to be stored in the energy storage unit. Therefore, the circuit arrangement can be operated with previously stored electrical energy even in the absence of mechanical vibration.

The energy storage unit preferably has a capacitance, which, illustratively, accumulates electrical charge carriers of a rectified induced current and can output these later as required to the functional unit.

The inductance may be an electrically conductive meander structure, for example. Said meander structure may be formed in and/or on the substrate. As an alternative, the inductance may be formed from an arrangement of a plurality of electrically conductive meander structures formed in the substrate plane one next to the other, one in the other and/or vertically one above the other with respect to the substrate plane. The interconnection or coupling of a plurality of meander structures in the substrate plane and/or perpendicularly thereto may increase the value of the inductance or the area region covered in which the permanent magnet brings about a temporally variable magnetic flux.

As an alternative, the inductance may be an electrically conductive spiral structure. The latter may comprise for example essentially concentric annuli having different radii which are arranged one in the other and are coupled to one another. As an alternative, the spiral structure may be realized from a plurality of rectangular interconnect structures arranged one in the other, optionally with rounded edges, the rectangles that are arranged one in the other being electrically coupled to one another. The inductance may also be an arrangement of a plurality of electrically conductive spiral structures formed in the substrate plane one next to the other, one in the other and/or vertically one above the other with respect to the substrate plane.

The permanent magnet may be arranged in a manner suspended freely above the substrate and be coupled to the substrate by means of at least one elastic spring element. A freely suspended permanent magnet can move particularly effectively relative to an inductance integrated in stationary fashion in the substrate. A freely suspended permanent magnet structure in an integrated circuit may be formed for example by forming an auxiliary layer on the substrate (which contains the inductance for example therein/therebelow) and depositing above that a permanent magnet layer which is subsequently patterned. After the patterning of the permanent magnet layer for forming the permanent magnet, the auxiliary layer may be removed for example by means of underetching, as a result of which the permanent magnet is realized in a freely suspended manner. At the ends of the permanent magnet, the latter may be coupled to the substrate or to an elastic spring element which may be formed at edge regions of the substrate. It should furthermore be noted that, as an alternative to a freely suspended permanent magnet, the inductance may be provided in a freely suspended manner and the permanent magnet may be provided such that it is integrated in stationary fashion in the substrate. All that is important is a relative movement between permanent magnet and inductance in order to realize a temporal alteration of the magnetic flux through the inductance.

The permanent magnet may have one comb structure or a plurality of comb structures. A comb structure with a central holding region and a plurality of teeth formed in a manner proceeding from the holding region (e.g., orthogonally thereto) is easy to produce, robust and enables an effective electrical energy supply in combination for example with an inductance of the meander form. Such a comb structure is used in MEMS technology ("microelectromechanical manufacturing systems") for example in acceleration sensors of airbags. In contrast to such systems, the comb structure in accordance with the circuit arrangement according to the invention serves for generating electrical energy from mechanical vibration energy. If such a comb structure moves above a coil arrangement (inductance), an induced voltage may be induced in the coil arrangement and is utilized for energy supply purposes.

As an alternative to the comb structure, the permanent magnet may have one tongue structure or a plurality of tongue structures. In such a case, the permanent magnet may be fixed to the substrate only at one end by means of a spring element, so that the permanent magnet can vibrate in accordance with the cantilever principle in a manner similar to that in the case of a reed frequency measuring device.

The permanent magnet may be set up in such a way that its magnetization direction extends essentially orthogonally with respect to the surface of the substrate.

In this case, the magnetic field lines permeate the inductance, preferably formed in the substrate plane, essentially perpendicularly, so that, in the case of a relative movement between permanent magnet and inductance, it is possible to obtain a particularly great variation of the magnetic flux and thus a particularly high induced voltage.

The system comprising at least one elastic spring element and the permanent magnet may be adapted to a predeterminable resonant frequency, i.e., a vibration frequency to which the system can build up oscillations particularly well. By way of example, if it is known a priori that a circuit arrangement of the invention is intended to be operated in combination with a specific motor which typically vibrates at a specific frequency, then the dimensions, materials and spring constants of the system comprising spring element and permanent magnet can be adapted to this predetermined frequency, thereby enabling the mechanical vibration system to build up oscillations particularly effectively to the vibration generated by the motor. As a result, the mechanical energy can be particularly effectively converted into electrical energy.

Preferably, a plurality of elastic spring elements may be provided, the system comprising the plurality of elastic spring elements and the permanent magnet being adapted to a plurality of different predeterminable resonant frequencies or at least one predeterminable band of resonant frequencies. In this way, it is possible for the circuit arrangement according to the invention to be able flexibly, in different frequency ranges of exciting vibrations, itself to effect oscillation in the presence of such vibration and thus to generate energy effectively. In particular, the system may be adapted to building up oscillations of vibration of one frequency band or a plurality of different frequency bands, thereby enabling energy to be obtained on the basis of very different external vibrations.

The permanent magnet may be moveable relative to the inductance in two mutually orthogonal directions in the substrate plane. For this purpose, by way of example, two structures comprising inductance and permanent magnet which are oriented essentially vertically with respect to one another in the substrate plane may be formed next to one another, each structure thereof being set up for building up oscillations to external vibration of a specific vibration direction in the substrate plane in order to enable an energy supply of the functional unit for different vibration directions of an exciting vibration.

A magnetic field shielding region may be formed between the substrate, on the one hand, and the permanent magnet and the inductance, on the other hand, and is set up for shielding the magnetic field of the permanent magnet in the substrate. By way of example, if the functional unit and/or a (different) circuit is integrated in the substrate and one or more signal planes are provided above that, then an induced voltage flowing in the inductance or the magnetic field of the permanent magnet may also be coupled undesirably as an interference signal into said signal planes or the circuit integrated in the substrate. This can be avoided by forming a magnetic field shielding region, for example a layer made of soft-magnetic material such as iron, between the integrated circuit and the signal planes, on the one hand, and the inductance and the permanent magnet, on the other hand, which magnetic field shielding region protects magnetic fields formed by permanent magnet and inductance against coupling into the signal planes or the integrated circuit.

By way of example, iron, cobalt, nickel or a permanent-magnetic rare earth material may be used as permanent-magnetic material for the permanent magnet.

BRIEF DESCRIPTION OF THE DRAWINGS

Exemplary embodiments of the invention are illustrated in the figures and are explained in more detail below. In the figures.

Identical or similar components in different figures are provided with identical reference numerals.

The illustrations in the figures are diagrammatic and not to scale.

DETAILED DESCRIPTION OF THE PREFERRED MODE OF THE INVENTION

A description is given below, referring to FIGS. 1A and 1B, of a circuit arrangement 100 in accordance with a first preferred exemplary embodiment of the invention.

Figure 1A:
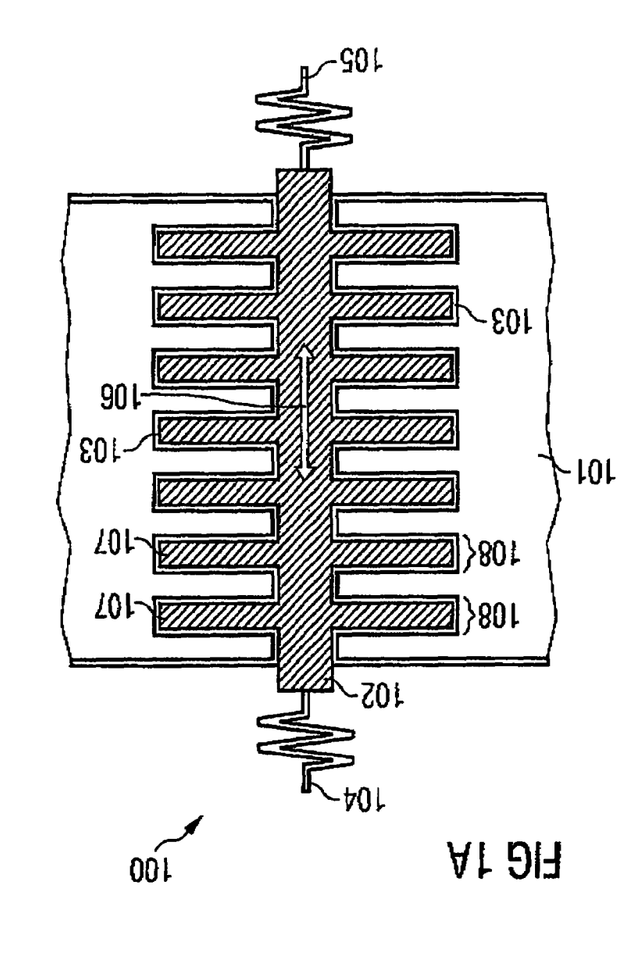
FIGS. 1A and 1B show a plan view of a monolithic integrated circuit arrangement in accordance with a first exemplary embodiment of the invention in two different operating states.
Figure 1B:
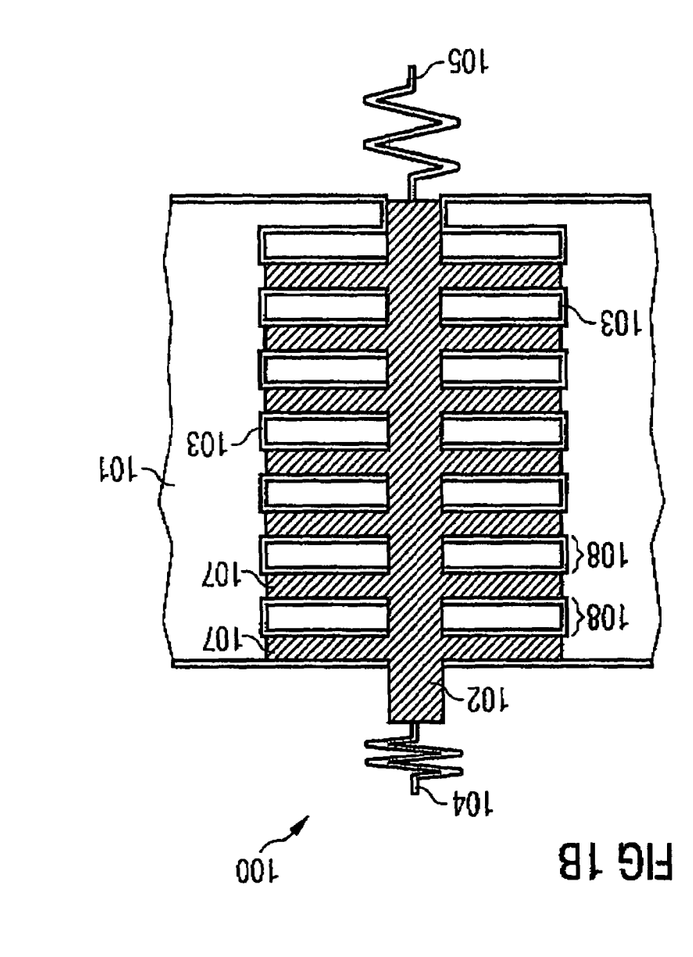

The circuit arrangement 100, shown in plan view in two different operating states in FIG. 1A and FIG. 1B, is integrated monolithically in or on a silicon substrate 101. A temperature sensor (not shown) is formed in the silicon substrate 100 as a functional unit for determining the temperature of a motor (not shown) to which the circuit arrangement 100 is fitted. The circuit arrangement 100 can communicate contactlessly with an external control unit (not shown). In particular, the circuit arrangement 100 can communicate a temperature signal to the external control unit by means of electromagnetic radiation. A meander coil 103 is provided as an integrated inductance on the silicon substrate 101. Above the meander coil 103, a permanent-magnetic nickel comb structure 102 is provided in freely suspended fashion as a permanent magnet, which is coupled to the silicon substrate 101 by means of first and second spring elements 104, 105. The nickel comb structure 102 and the meander coil 103 together form an energy supply unit for supplying the temperature sensor with electrical energy obtained from external vibration of the motor. An arrow 106 specifies a direction of movement along which the nickel comb structure 102 can be moved if external vibration of the motor is present.

The magnetization direction of the permanent-magnetic material of the nickel comb structure 102 is oriented perpendicular to the chip plane or the paper plane of FIGS. 1A and 1B, that is to say perpendicular to the surface of the silicon substrate 101. The nickel comb structure 102 moves in the presence of external vibration above and relative to the meander coil 103. The nickel comb structure 102 has a multiplicity of comb teeth 107 whose dimensioning is adapted to the dimensioning of a coil loop 108 of the meander coil 103. In the event of the nickel comb structure 102 moving in the direction 106 of movement, there is a change in the magnetic flux through the meander coil 103, as a result of which an induced current is induced or generated in the meander coil 103.

In the event of a deflection of the nickel comb structure 102 on account of external vibration, a restoring force is exerted on the nickel comb structure 102 by means of the first and second spring elements 104, 105. As a result, the nickel comb structure 102 oscillates back and forth between two extreme positions, an electrical voltage thereby being induced in the meander coil 103.

During the fabrication of the circuit arrangement 100, the spring elements 104, 105 may be formed in the same work step as the nickel comb structure 102. The fabrication of such a spring system 104, 105 per se is known from MEMS technology. The spring elements 104, 105 are adapted to a frequency of vibration at which the motor typically oscillates as a vibration source. Particularly effective generation of energy is possible by virtue of the resonant frequency of the spring elements 104, 105 thus illustratively being made to correspond to an expected external excitation.

FIG. 1A shows the circuit arrangement 100 in a first operating state, in which the nickel comb structure 102 is shown at the zero crossing. The first and second spring elements 104, 105 are thus not deflected in this operating state. At the zero crossing, as indicated by the arrow 106, a high transient speed of the nickel comb structure 102 is afforded by its rest position.

In a second operating state of the monolithic integrated circuit arrangement 100, shown in FIG. 1B, the nickel comb structure 102 is deflected maximally, in the upper direction in accordance with FIG. 1B, thereby achieving a reversal point of the oscillation of the nickel comb structure 102. The first spring element 104 is greatly compressed and the second spring element 105 is greatly extended. At the reversal point, both spring elements 104, 105 exert a restoring force on the nickel comb structure 102, which causes the nickel comb structure 102 to move downward in accordance with FIG. 1B.

Figure 2:
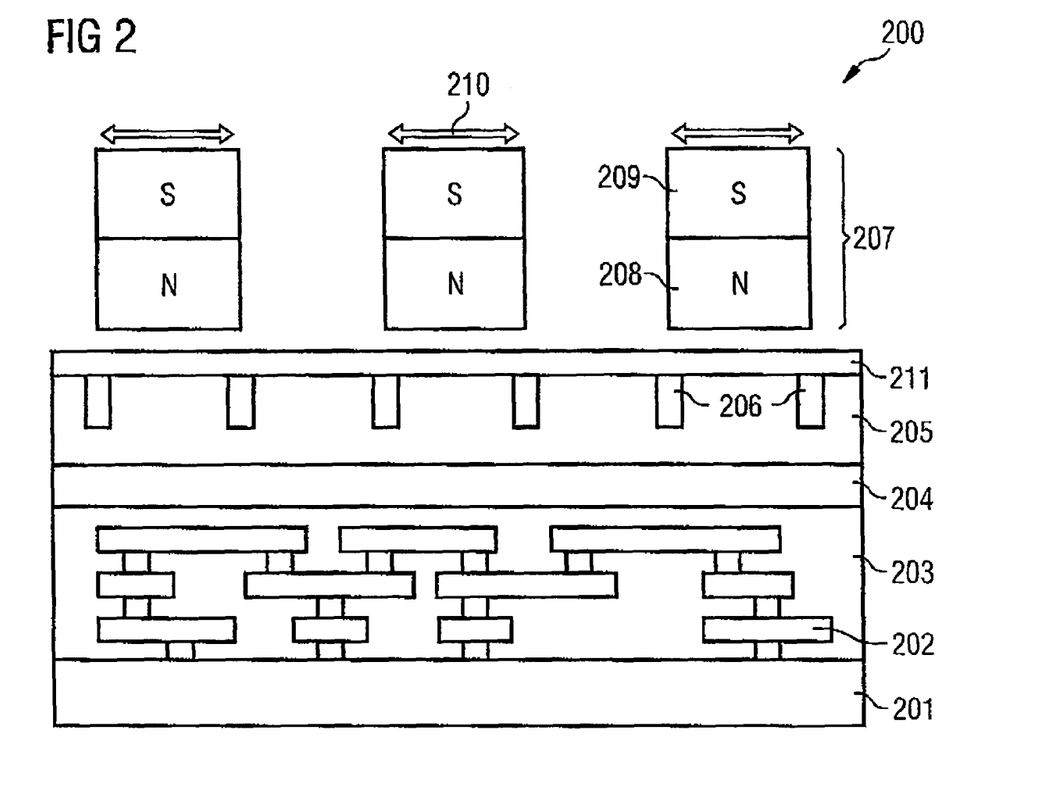
FIG. 2 shows a cross section of a monolithic integrated circuit arrangement in accordance with a second exemplary embodiment of the invention.

A description is given below, referring to FIG. 2, of a circuit arrangement 200 in accordance with a second exemplary embodiment of the invention.

The circuit arrangement 200 has a silicon substrate 201, in which an integrated circuit (not shown) is formed, the latter forming the functional unit of the circuit arrangement 200. A signal plane is formed above the silicon substrate 201, said signal plane having interconnects 202 made of aluminum or copper material which are embedded in an insulation region 203 (e.g., made of silicon oxide, $SiO_2$, or made of a low-k material). A soft-magnetic layer 204 made of a soft-magnetic material is formed on the signal plane. A meander coil 206 made of aluminum or copper material is formed on the soft-magnetic layer 204, in a manner embedded in a silicon oxide layer 205, said meander coil serving as an inductance of an energy supply unit of the circuit arrangement 200 for supplying the integrated circuit in the silicon substrate 201 with electrical operating energy. The coil 206 may optionally be covered with a protective layer 211 (e.g., made of silicon nitride material, $Si_3N_4$) which may be important for example for the purpose of etching free a comb structure as permanent magnet. Above the meander coil 206, coupled to the substrate by means of a spring element (not shown), is a cobalt permanent magnet 207 having a comb structure, three teeth of which can be seen in FIG. 2. Each of the teeth is shown diagrammatically with a north pole 208 and a south pole 209. The magnetic field direction of the cobalt permanent magnet 207 extends in the vertical direction in accordance with FIG. 2. Direction of movement 210 indicates how the cobalt permanent magnet 207 moves in the presence of external vibration. As a result, the magnetic flux through the meander coil 206 changes, as a result of which an induced voltage or an induced current is generated in the meander coil 206. This is used to supply the functional unit in the silicon substrate 201 with electrical energy.

The temporally variable magnetic field on account of the vibration of the cobalt permanent magnet 207 generates an electric current in the conductor loops of the meander coil 206. However, the presence of such a magnetic field in the wiring planes 202 for the logic on the silicon chip 201, that is to say in particular in the region of the interconnects 202, is undesirable since such a magnetic field in the signal-carrying interconnects 202 constitutes an interference signal. In order to eliminate this problem, in the case of the circuit arrangement 200, a shielding plane, that is to say the soft-magnetic layer 204 made of a soft-magnetic material, is integrated in the circuit arrangement 200. The soft-magnetic layer 204 is arranged between the signal planes 202 and the meander coil 206. Consequently, the interconnects 202 and also integrated components in the silicon substrate 201 are reliably protected from an undesirable variable magnetic field.

Figure 3:
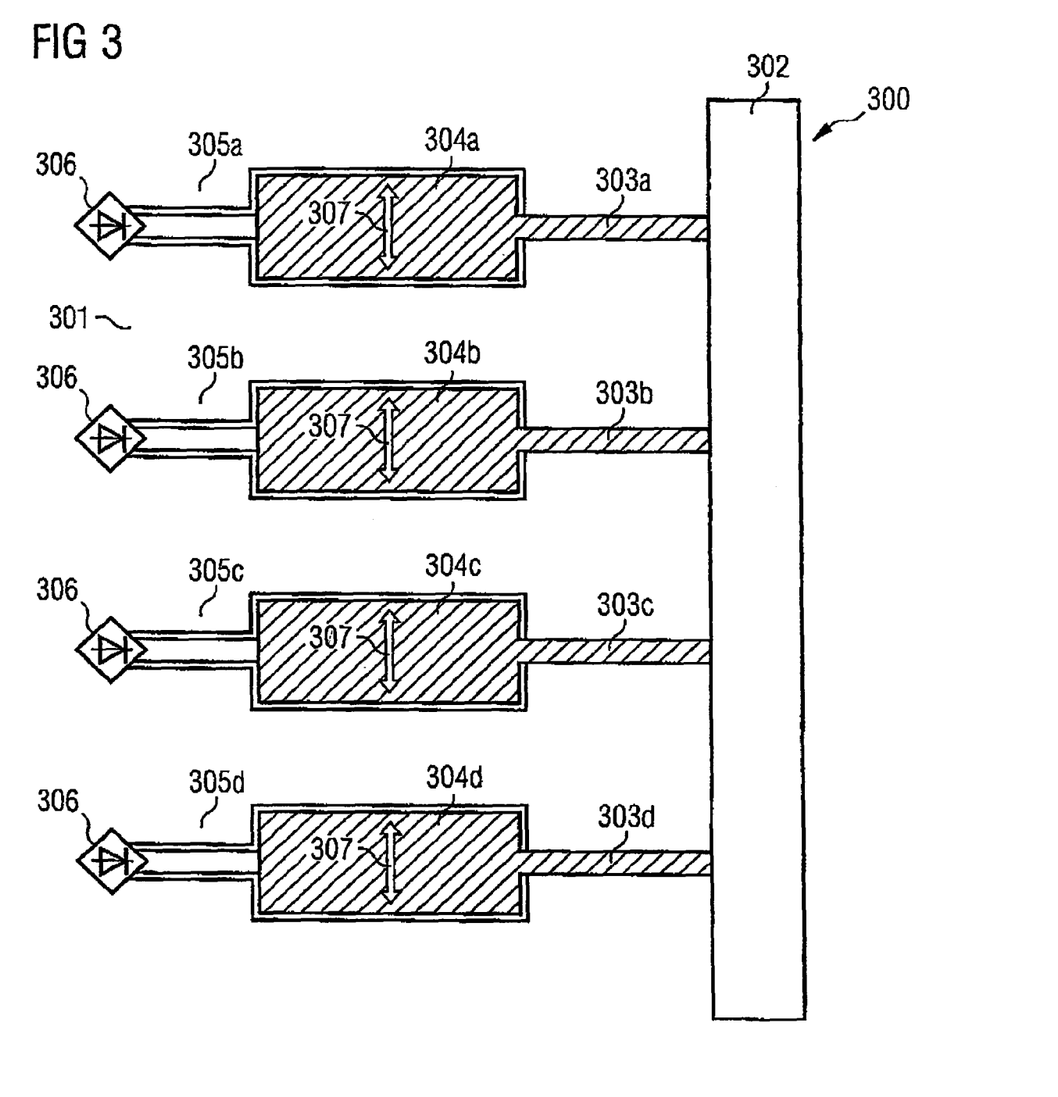
FIG. 3 shows a plan view of a monolithic integrated circuit arrangement in accordance with a third exemplary embodiment of the invention.

A description is given below, referring to FIG. 3, of a circuit arrangement 300 in accordance with a third exemplary embodiment of the invention.

The circuit arrangement 300 is integrated on and in a silicon chip 301. Four structures are held in freely suspended fashion in accordance with the cantilever type by means of a holding element 302, which is formed in parallelepipal fashion e.g., from silicon oxide material on a surface region of the silicon chip 301. The holding element 302 may also be formed from magnetic, in particular permanent-magnetic, material which, however, is not formed in freely suspended fashion but rather is fixed to the silicon chip 301. The holding element 302 is generally wider, preferably significantly wider, than the moveable components 303a to 303d, 304a to 304d. Each of the structures is formed from a spring element 303a to 303d coupled to the holding element 302 and from a permanent-magnetic iron tongue 304a to 304d coupled to the respective spring element 303a to 303d, as permanent magnet of an energy supply unit. At least one respective structure of the structures 303a+304a, 303b+304b, 303c+304c, 303d+304d can be caused to oscillate in the presence of external vibration. Furthermore, on the silicon chip 301, first to fourth loops 305a to 305d are formed as inductance of an energy supply unit of the circuit arrangement 300.

As is described below, an induced voltage can be generated in each of the loops 305a to 305d, and can be rectified by means of a respective rectifier 306 between the respective loop ends, so that a sensor as functional unit of the circuit arrangement 300 can be supplied with an electrical DC current.

The freely suspended arrangements each formed from one of the spring element strips 303a to 303d extending in a manner proceeding from the holding element 302 and one of the first to fourth iron tongues 304a to 304d fitted to the free end section of a respective spring element strip 303a to 303d, as permanent magnet, are provided at the holding element 302, which extends vertically with respect to the silicon chip 301. As is indicated by means of arrows 307, one or more of the arrangements comprising a spring element 303a to 303d and an associated iron tongue 304a to 304d can vibrate in the event of exciting external vibration.

In the case of the circuit arrangement 300, the permanent-magnetic material of the energy supply unit is not provided in the form of a comb structure, as in FIG. 1, but rather as iron tongues 304a to 304d which are provided separately from one another. Each of the tongues 304a to 304d oscillates over an associated meander loop 305a to 305d. The first to fourth spring elements 303a to 303d are embodied as a narrowed part of the associated iron tongue 304a to 304d, which spring elements 303a to 303d are fixed laterally to the holding element 302.

In the case of the circuit arrangement 300, the tongues 304a to 304d and the associated spring elements 303a to 303d are in each case embodied such that each of the arrangements 303a and 304a, 303b and 304b, 303c and 304c, and 303d and 304d can build up oscillations optimally (i.e., at resonance) at a predetermined frequency of an exciting external oscillation. Consequently, a broad frequency band of exciting oscillations can be covered by the circuit arrangement 300, one or more of the tongues 304a to 304d together with the spring elements 303a to 303d oscillating at resonance in the event of external vibration having a specific vibration frequency. Since not necessarily all the tongues 304a to 304d have to oscillate with a fixed phase relationship with respect to one another, a separate rectifier 306 is provided for each conductor loop 305a to 305d.

Illustratively, each of the tongues 304a to 304d has a thin extension serving as spring element 303a to 303d. By adapting the geometry of tongue 304a to 304d and spring 303a to 303d, it is possible to set the respective resonant frequency of a tongue-spring combination. As an alternative, the conductor loops 305a to 305d below the tongues 304a to 304d may also be embodied as a spiral inductor or the like.

FIGS. 4A to 4D show various embodiments for the inductances of the circuit arrangement according to the invention.

Figure 4A:
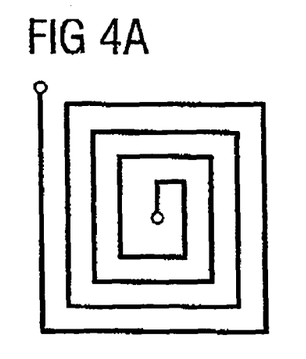
FIGS. 4A to 4D show inductances in accordance with different exemplary embodiments of the invention for use in a monolithic integrated circuit arrangement in accordance with the invention.

The coil shown in FIG. 4A is a spiral inductor, in which a plurality of essentially rectangularly formed turns are provided one in the other.

Figure 4B:
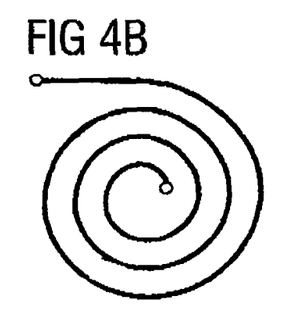

The spiral inductor from FIG. 4B is formed from essentially circular and concentric turns with a radius that increases from the inside outward.

Figure 4C:
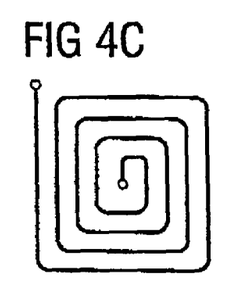

The spiral inductor from FIG. 4C differs from the spiral inductor from FIG. 4A by the fact that it has interconnects with rounded edges.

Figure 4D:
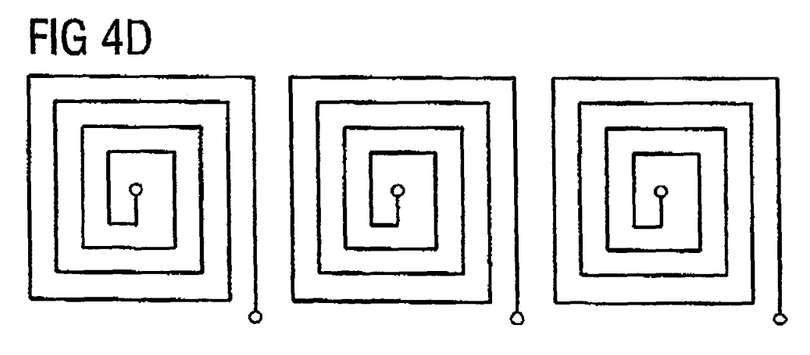

FIG. 4D shows an inductance in which three of the spiral inductors shown in FIG. 4A are connected up together. A plurality of the inductors shown in FIG. 4A, FIG. 4B and FIG. 4C can be connected together with one another in any desired combination in order to be able to obtain electrical energy from a vibrating permanent magnet in a particularly effective manner. Such inductors may be arranged one next to the other and/or one above the other (that is to say also in two dimensions in the substrate plane) and also in a third dimension (that is to say a plurality of spiral inductor planes perpendicular to the plane of the drawing of FIG. 4D).

A description is given below, referring to FIG. 5A to FIG. 5D, of layer sequences at different points in time during a method for fabricating a monolithic integrated circuit arrangement in accordance with a fourth exemplary embodiment of the invention.

Figure 5A:
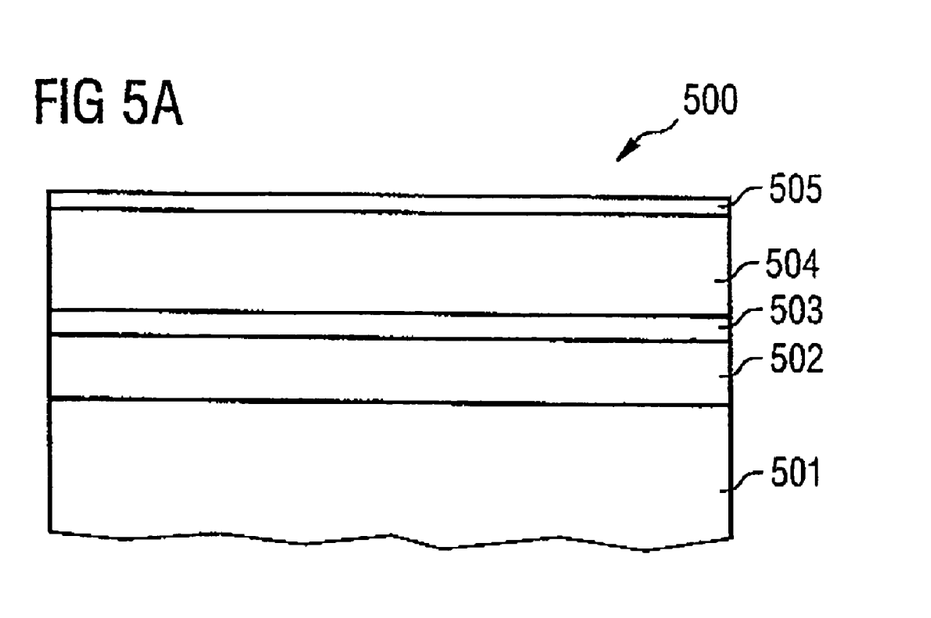
FIGS. 5A to 5D show layer sequences at different points in time during a method for fabricating a monolithic integrated circuit arrangement in accordance with a fourth exemplary embodiment of the invention.

In order to obtain the layer sequence 500 shown in FIG. 5A, a silicon oxide layer 502 having a thickness of approximately 100 nanometers is formed on a silicon substrate 501. A titanium nitride layer 503 having a thickness of approximately 10 nanometers to 100 nanometers is deposited on the silicon oxide layer 502. An aluminum layer 504, which, by way of example, may have a thickness of approximately 100 nanometers to 1000 nanometers, is deposited on the layer sequence thus obtained. An additional titanium nitride layer 505 having a thickness of approximately 10 nanometers to 100 nanometers is deposited on the aluminum layer 504.

Figure 5B:
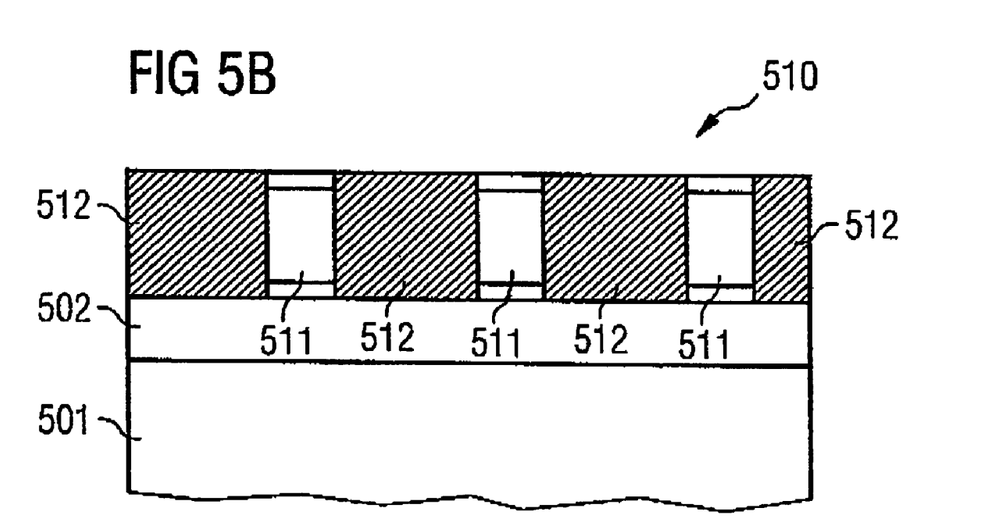

In order to obtain the layer sequence 510 shown in FIG. 5B, the titanium nitride layer 503, the aluminum layer 504 and the additional titanium nitride layer 505 of the layer sequence 510 are patterned using a lithography and an etching method in such a way that an integrated meander coil 511 is thereby generated. Silicon nitride material (alternatively silicon oxide material or a low-k material) is deposited on the patterned layer sequence and planarized using a CMP method ("chemical mechanical polishing"). A silicon nitride region 512 in which the meander coil 511 is embedded is thereby formed. If the intention is to form a meander coil 511 based on copper material instead of aluminum material, then this can be realized using a damascene method.

Figure 5C:
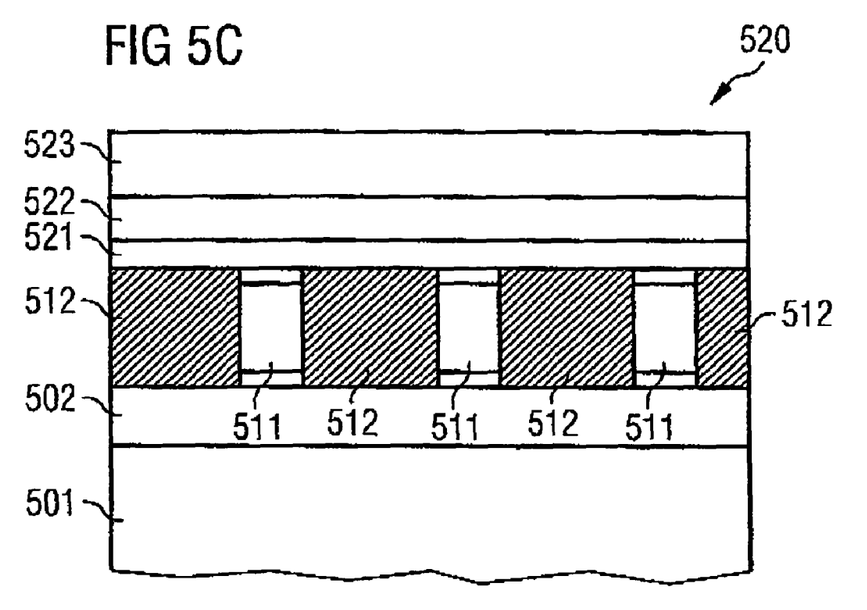

In order to obtain the layer sequence 520 shown in FIG. 5C, firstly an etching stop layer 521 made of silicon nitride material is deposited on the surface of the layer sequence 510, a sacrificial layer 522 made of silicon oxide material is deposited on the etching stop layer 521, and a magnetic layer 523 made of ferromagnetic iron material is deposited on the sacrificial layer 522. The vertical extent of the magnetic layer 523 in accordance with FIG. 5C is approximately 200 nanometers.

Figure 5D:
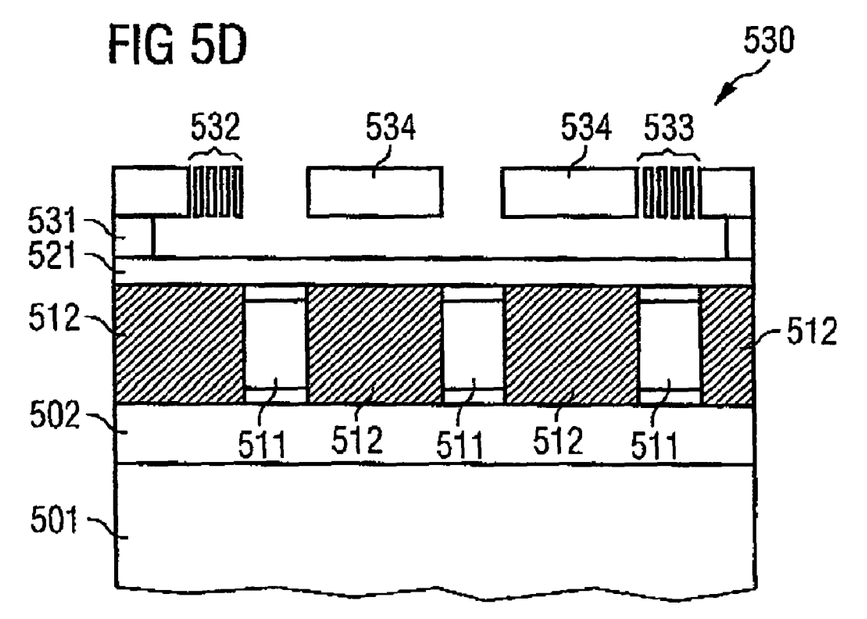

In order to obtain the circuit arrangement 530 in accordance with a fourth exemplary embodiment of the invention as shown in FIG. 5D, firstly the magnetic layer 523 is patterned using a lithography and an etching method in such a way that first and second spring elements 532, 533 are formed, between which is arranged an iron comb structure 534 formed in a central region of the patterned magnetic layer 523.

In order to realize the iron comb structure 534 in freely suspended fashion, the sacrificial layer 522 is subsequently removed below the region of the first and second spring elements 532, 533 and the iron comb structure 534 using a selective etching method, so that only in edge regions of the circuit arrangement 530 does material of the sacrificial layer 522 remain as spacer 531 for maintaining a vertical distance between the etching stop layer 521 and the components of the magnetic layer 523 arranged thereabove. During this etching method, the etching stop layer 521 serves for stopping the selective etching method, in the course of which essentially only the material of the sacrificial layer 522 is etched, whereas the material of the etching stop layer 521, on the other hand, is not etched.

A description is given below, referring to FIG. 6A to FIG. 6C, of a method for fabricating a circuit arrangement in accordance with a fifth exemplary embodiment of the invention.

Figure 6A:
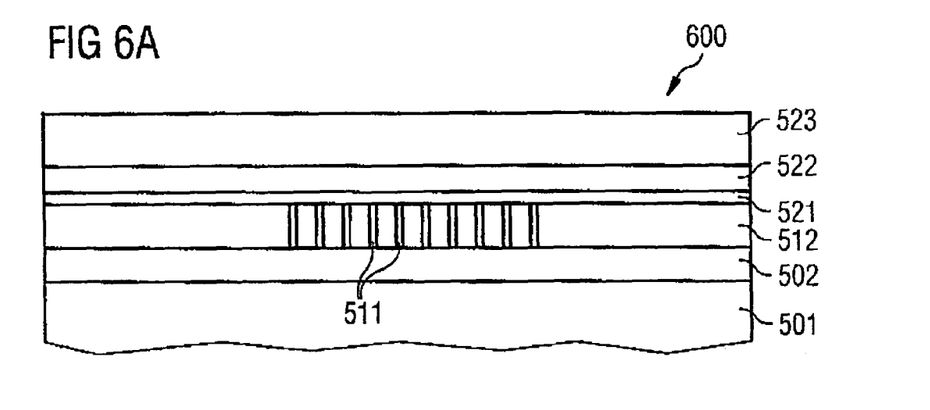
FIGS. 6A to 6C show layer sequences at different points in time during a method for fabricating a monolithic integrated circuit arrangement in accordance with a fifth exemplary embodiment of the invention.

The layer sequence 600 shown in FIG. 6A essentially corresponds to the layer sequence 520 shown in FIG. 5C. However, more individual components, that is to say coil turns of the meander coil 511, are provided in the case of the layer sequence 600 than in accordance with FIG. 5C.

A description is given below referring to FIG. 6B, FIG. 6C of a circuit arrangement in accordance with the fifth exemplary embodiment of the invention. FIG. 6B shows a plan view 610 of the circuit arrangement, whereas FIG. 6C shows a cross-sectional view 620 of the circuit arrangement, taken along a sectional line I–I' shown in FIG. 6B.

Figure 6B:
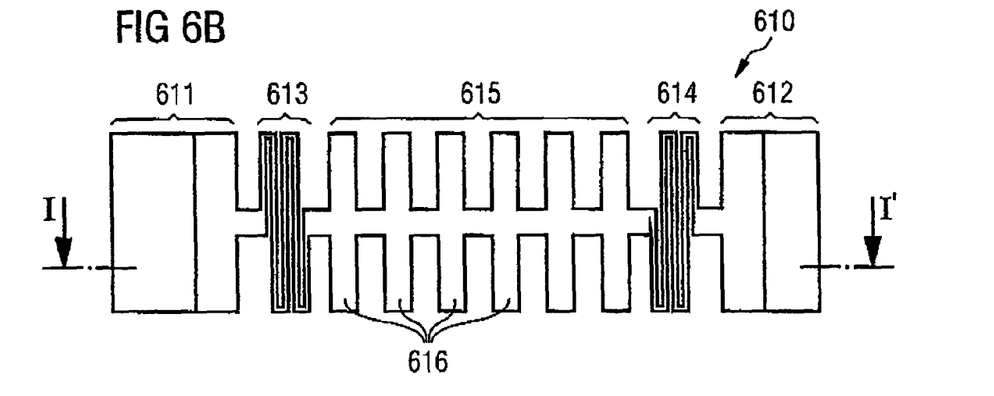
Figure 6C:
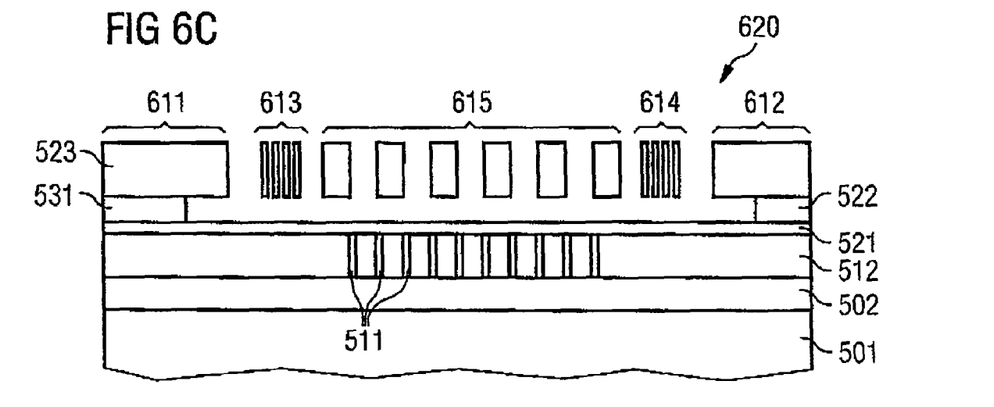

In order to obtain the circuit arrangement shown in FIG. 6B, FIG. 6C, the magnetic layer 523 of the layer sequence 600 is patterned using a lithography and an etching method in such a way that first and second holding regions 611, 612 are formed at left-hand and right-hand edge regions of the patterned magnetic layer 523 in accordance with FIG. 6B, FIG. 6C. An iron comb structure 615 having a plurality of teeth 616 is formed in a central region of the patterned magnetic layer 523. A first spring element 613 is formed between the first holding region 611 and a left-hand section of the iron comb structure 615 in accordance with FIG. 6B, FIG. 6C. A second spring element 614 is formed between the right-hand section of the iron comb structure 615 in accordance with FIG. 6B, FIG. 6C and the second holding region 612. After the magnetic layer 523 has been patterned, material of the sacrificial layer 522 is removed using an isotropic etching method, so that spacers 531 remain only in left-hand and right-hand partial regions, in accordance with FIG. 6C, of the circuit arrangement between the etching stop layer 521 and the magnetic layer 523.

If copper is intended to be used as material for the meander coil in the circuit arrangement according to the invention, then the meander coil is preferably formed in accordance with a damascene method.

A description is given below, referring to FIG. 7A to FIG. 7E, of layer sequences at different points in time during a method for fabricating a circuit arrangement in accordance with a sixth exemplary embodiment of the invention, in which the meander coil is formed from copper material.

Figure 7A:
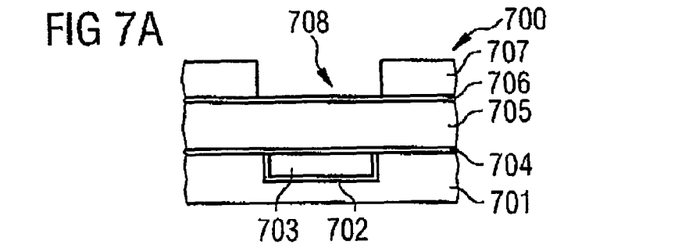
FIGS. 7A to 7E show layer sequences at different points in time during a method for fabricating a monolithic integrated circuit arrangement in accordance with a sixth exemplary embodiment of the invention.

In order to obtain the layer sequence 700 shown in FIG. 7A, a first silicon oxide layer 701 is patterned using a lithography and an etching method, and a barrier region 702 is formed in trenches thus formed. The trench or the trenches is or are subsequently filled with copper material, so that a first copper region 703 is formed according to a planarization method (e.g., CMP method, "chemical mechanical polishing"). Silicon nitride material is deposited on the layer sequence thus obtained, as a result of which a first silicon nitride etching stop layer 704 is formed. A second silicon oxide layer 705 is formed on the layer sequence thus obtained. A second silicon nitride etching stop layer 706 is formed on the layer sequence thus obtained. An additional silicon oxide layer is deposited on the second silicon nitride etching stop layer 706 and patterned using a lithography and an etching method to form a silicon oxide region 707, into which a trench 708 is introduced.

Figure 7B:
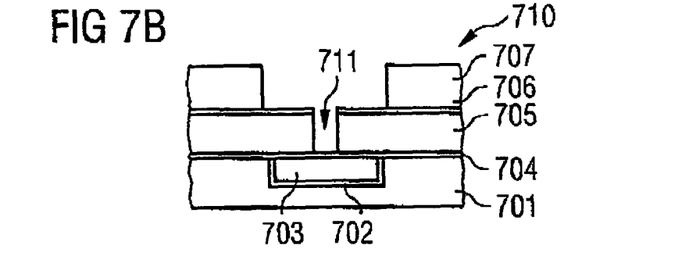

In order to obtain the layer sequence 710 shown in FIG. 7B, an additional trench 711 is introduced into the second silicon oxide layer 705 and the second silicon nitride etching stop layer 706 using a lithography and an etching method. The additional trench 711 serves as a via opening. During the etching of the second silicon oxide layer 705, the first silicon nitride etching stop layer 704 serves for stopping the etching operation. Afterward, a photomask (not shown) formed for the patterning may be removed for example using an oxygen plasma method. During the removal of the photoresist, the first copper region 703 is protected from being adversely influenced by the oxygen plasma by means of the first silicon nitride etching stop layer 704.

Figure 7C:
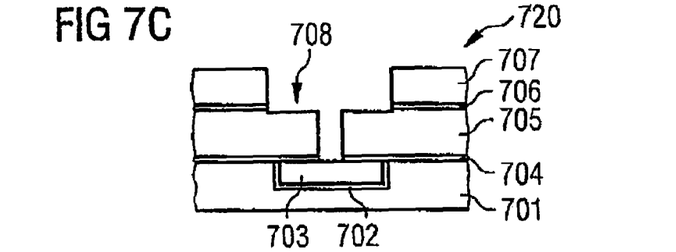

In order to obtain the layer sequence 720 shown in FIG. 7C, the layer sequence 710 is subjected to a selective etching method for removing uncovered silicon nitride material, so that uncovered silicon nitride material of the first and second silicon nitride etching stop layers 704, 706 is removed. Copper material of the first copper region 703 is thereby uncovered. On account of an overetching, the trench 708 now extends slightly into the second silicon oxide layer 705.

Figure 7D:
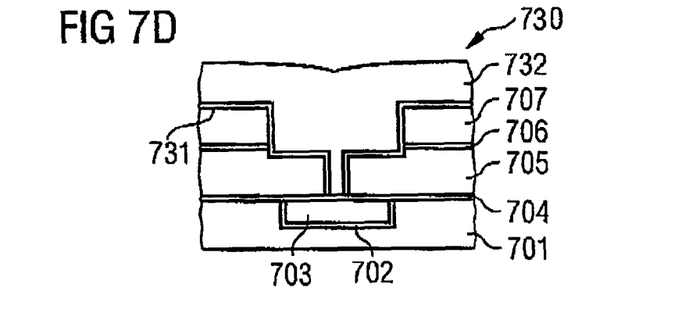

In order to obtain the layer sequence 730 shown in FIG. 7D, material for forming a barrier layer 731 is applied to the layer sequence 720 using a sputtering method. Furthermore, in a two-stage process, a second copper region 732 is applied over the whole area on the barrier layer 731. For this purpose, firstly a thin seed layer is deposited using a sputtering method, followed by deposition of additional copper for forming the second copper region 732 using an electroplating method.

Figure 7E:
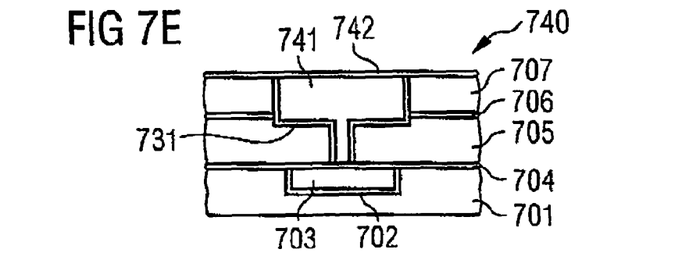

In order to obtain the layer sequence 740 shown in FIG. 7E, material of the second copper region 732 projecting vertically above the barrier layer 731 is removed using a CMP method ("chemical mechanical polishing"), thereby forming a third copper region 741. Furthermore, silicon nitride material is deposited on the surface of the layer sequence thus obtained, as a result of which a protective layer 742 is obtained.

At least one part of the copper structure formed from first and third copper regions 703, 741 may be used for example as a meander coil or a turn of the meander coil.

The invention claimed is:

1. A monolithic integrated circuit arrangement comprising:
   a substrate;
   a functional unit formed in and/or on the substrate;
   an energy supply unit formed in and/or on the substrate and monolithically integrated with the functional unit, the energy supply unit includes an inductance and a permanent magnet having one or a plurality of comb or tongue structures,
   wherein, under a vibration on the circuit arrangement, the permanent magnet is moved relative to the inductance thereby inducing an electrical voltage and supplying the functional unit with electrical energy.

2. The monolithic integrated circuit arrangement as claimed in claim 1, wherein the substrate is a semiconductor substrate.

3. The monolithic integrated circuit arrangement as claimed in claim 1, wherein the functional unit is a sensor.

4. The monolithic integrated circuit arrangement as claimed in claim 3, wherein the sensor is one or more of a rotational speed sensor, a temperature sensor, a pressure sensor, a chemical sensor, a gas sensor, a biosensor, a radiation sensor, and a sensor for detecting a vibration frequency.

5. The monolithic integrated circuit arrangement as claimed in claim 1, wherein the monolithic integrated circuit arrangement is fitted to a vibration source.

6. The monolithic integrated circuit arrangement as claimed in claim 5, wherein the vibration source has a motor.

7. The monolithic integrated circuit arrangement as claimed in claim 1, further comprising a communication interface for contactless communication with an external control unit.

8. The monolithic integrated circuit arrangement as claimed in claim 1, wherein the energy supply unit has a rectifier device that rectifies an induced voltage of the inductance, for supplying the functional unit with a DC voltage.

9. The monolithic integrated circuit arrangement as claimed in claim 1, wherein the energy supply unit has an energy storage unit, in which electrical charge carriers generated by the induced voltage can be buffer-stored.

10. The monolithic integrated circuit arrangement as claimed in claim 9, wherein the energy storage unit is formed from a capacitance.

11. The monolithic integrated circuit arrangement as claimed in claim 1, wherein the inductance is an electrically conductive meander structure.

12. The monolithic integrated circuit arrangement as claimed in claim 1, wherein the inductance is an arrangement of a plurality of electrically conductive meander structures formed in the substrate plane one next to another and/or vertically one above another with respect to the substrate plane.

13. The monolithic integrated circuit arrangement as claimed in claim 1, wherein the inductance is an electrically conductive spiral structure.

14. The monolithic integrated circuit arrangement as claimed in claim 1, wherein the inductance is an arrangement of a plurality of electrically conductive spiral structures formed in the substrate plane one next another and/or vertically above another with respect to the substrate plane.

15. The monolithic integrated circuit arrangement as claimed in claim 1, wherein the permanent magnet is suspended freely above the substrate and is coupled to the substrate by at least one elastic spring element.

16. The monolithic integrated circuit arrangement as claimed in claim 1, wherein the permanent magnet's magnetization direction extends essentially orthogonally with respect to the surface of the substrate.

17. The monolithic integrated circuit arrangement as claimed in claim 15, wherein the at least one elastic spring element and the permanent magnet together are adapted to a predetermined resonant frequency.

18. The monolithic integrated circuit arrangement as claimed in claim 15, further comprising a plurality of elastic spring elements, wherein the plurality of elastic spring elements and the permanent magnet together are adapted to a plurality of different predetermined resonant frequencies or at least one predetermined band of resonant frequencies.

19. The monolithic integrated circuit arrangement as claimed in claim 1, wherein the permanent magnet is moved relative to the inductance in two mutually orthogonal directions in the substrate plane.

20. The monolithic integrated circuit arrangement as claimed in claim 1, further comprising a magnetic field shielding region formed between the substrate and a combination of the permanent magnet and the inductance, wherein the magnetic field shielding region shields a magnetic field of the permanent magnet in the substrate.

21. A circuit arrangement comprising:
a functional unit;
an energy supply unit including an inductance and a permanent magnet having one or a plurality of comb or tongue structures, converting vibrational energy into electrical energy,
wherein the energy supply unit is monolithically integrated with the functional unit and energizes the functional unit.

* * * * *